United States Patent
Hsu et al.

(10) Patent No.: US 12,085,997 B2
(45) Date of Patent: Sep. 10, 2024

(54) CONTROL SYSTEM AND CONTROL METHOD

(71) Applicant: HTC Corporation, Taoyuan (TW)

(72) Inventors: Yuhui Hsu, Taoyuan (TW); Cheng-Han Hsieh, Taoyuan (TW)

(73) Assignee: HTC Corporation, Taoyuan (TW)

(*) Notice: Subject to any disclaimer, the term of this patent is extended or adjusted under 35 U.S.C. 154(b) by 0 days.

(21) Appl. No.: 18/155,772

(22) Filed: Jan. 18, 2023

(65) Prior Publication Data

US 2024/0241553 A1    Jul. 18, 2024

(51) Int. Cl.
*G06F 1/16*    (2006.01)
*G06F 3/041*    (2006.01)
*G06F 3/04815*    (2022.01)

(52) U.S. Cl.
CPC ............ *G06F 1/1694* (2013.01); *G06F 1/163* (2013.01); *G06F 3/0416* (2013.01); *G06F 3/04815* (2013.01)

(58) Field of Classification Search
CPC .... G06F 3/0416; G06F 3/04815; G06F 1/163; G06F 1/1694
See application file for complete search history.

(56) References Cited

U.S. PATENT DOCUMENTS

| | | | |
|---|---|---|---|
| 10,139,906 B1* | 11/2018 | Bai | G06F 3/014 |
| 2015/0277559 A1* | 10/2015 | Vescovi | G06F 3/017 345/173 |
| 2015/0277649 A1* | 10/2015 | Tan | G06F 3/04883 345/173 |
| 2016/0134737 A1* | 5/2016 | Pulletikurty | G06F 3/0485 715/735 |
| 2017/0300132 A1* | 10/2017 | Hiroi | A43B 3/34 |
| 2018/0060010 A1* | 3/2018 | Cho | G06F 3/147 |
| 2018/0108325 A1* | 4/2018 | Schwarz | G06T 11/60 |
| 2020/0387245 A1* | 12/2020 | Chen | G06F 3/0202 |
| 2022/0413609 A1* | 12/2022 | Mounier | G06F 3/04815 |
| 2023/0011572 A1* | 1/2023 | Anderson | H04M 1/72412 |
| 2023/0342022 A1* | 10/2023 | Choudhary | G06F 3/04817 |

* cited by examiner

*Primary Examiner* — Ryan A Lubit
(74) *Attorney, Agent, or Firm* — JCIPRNET (57) ABSTRACT

A control system is provided. The control system includes a ring device and a controller. The ring device includes an inertial measurement unit (IMU) sensor. The ring device is adapted to be worn on a finger of a user and the IMU sensor is configured to obtain sensor data. The controller is configured to receive the sensor data from the ring device and generate detection data based on the sensor data. The detection data is configured to indicate whether the ring device is rotated and whether the ring device is tapped. The controller is configured to perform a control operation in a virtual world displayed by the controller based on the detection data.

15 Claims, 8 Drawing Sheets

CONTROL SYSTEM AND CONTROL METHOD

BACKGROUND

Technical Field

The disclosure relates to a control system; particularly, the disclosure relates to a control system and a control method.

Description of Related Art

In order to bring an immersive experience to user, various technologies, such as augmented reality (AR) and virtual reality (VR), are constantly being developed. AR technology allows users to bring virtual elements to the real-world. VR technology allows users to enter a whole new virtual world to experience a different life.

SUMMARY

The disclosure is direct to a control system and a control method, so as to improve the user experience.

In this disclosure, a control system is provided. The control system includes a ring device and a controller. The ring device includes an inertial measurement unit (IMU) sensor. The ring device is adapted to be worn on a finger of a user and the IMU sensor is configured to obtain sensor data. The controller is configured to receive the sensor data from the ring device and generate detection data based on the sensor data. The detection data is configured to indicate whether the ring device is rotated and whether the ring device is tapped. The controller is configured to perform a control operation in a virtual world displayed by the controller based on the detection data.

In this disclosure, a control method is provided. The control method includes: receiving sensor data from an IMU sensor of a ring device, wherein the ring device is adapted to be worn on a finger of a user; generating detection data based on the sensor data, wherein detection data is configured to indicate whether the ring device is rotated and whether the ring device is tapped; and performing a control operation in a virtual world displayed by a controller based on the detection data.

Based on the above, according to the control system and the control method, inputs from the user may be gathered without influence of the environment and the hand of the user is still free to move.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Reference will now be made in detail to the exemplary embodiments of the disclosure, examples of which are illustrated in the accompanying drawings. Whenever possible, the same reference numbers are used in the drawings and the description to refer to the same or like components.

Certain terms are used throughout the specification and appended claims of the disclosure to refer to specific components. Those skilled in the art should understand that electronic device manufacturers may refer to the same components by different names. This article does not intend to distinguish those components with the same function but different names. In the following description and rights request, the words such as "comprise" and "include" are open-ended terms, and should be explained as "including but not limited to . . . ".

The term "coupling (or connection)" used throughout the whole specification of the present application (including the appended claims) may refer to any direct or indirect connection means. For example, if the text describes that a first device is coupled (or connected) to a second device, it should be interpreted that the first device may be directly connected to the second device, or the first device may be indirectly connected through other devices or certain connection means to be connected to the second device. The terms "first", "second", and similar terms mentioned throughout the whole specification of the present application (including the appended claims) are merely used to name discrete elements or to differentiate among different embodiments or ranges. Therefore, the terms should not be regarded as limiting an upper limit or a lower limit of the quantity of the elements and should not be used to limit the arrangement sequence of elements. In addition, wherever possible, elements/components/steps using the same reference numerals in the drawings and the embodiments represent the same or similar parts. Reference may be mutually made to related descriptions of elements/components/steps using the same reference numerals or using the same terms in different embodiments.

It should be noted that in the following embodiments, the technical features of several different embodiments may be replaced, recombined, and mixed without departing from the spirit of the disclosure to complete other embodiments. As long as the features of each embodiment do not violate the spirit of the disclosure or conflict with each other, they may be mixed and used together arbitrarily.

In order to bring an immersive experience to user, various technologies, such as augmented reality (AR) and virtual reality (VR), are constantly being developed. AR technology allows users to bring virtual elements to the real-world. VR technology allows users to enter a whole new virtual world to experience a different life.

A handheld device or a hand gesture recognition is often used to gather inputs from the user. However, the hand of the user may be occupied by the handheld device and the user may not be able to do other stuff at the same time. In addition, the hand gesture recognition requires a clear field of view of a camera. When the field of view is blocked by an object in the environment or a body part of the user, the hand gesture recognition may not be able to be performed. Therefore, how to gather inputs from a hand-free user without influence of the environment has been a goal that the people skilled in the art want to improve.

Figure 1:
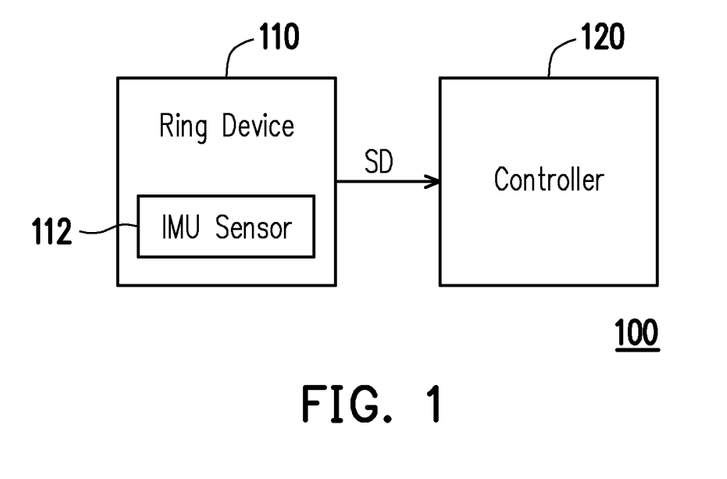
FIG. 1 is a schematic diagram of a control system according to an embodiment of the disclosure.

FIG. 1 is a schematic diagram of a control system according to an embodiment of the disclosure. With reference to FIG. 1, a control system 100 includes a ring device 110 and a controller 120. The ring device 110 includes an inertial measurement unit (IMU) sensor 112. The ring device 110 is adapted to be worn on a finger of a user. The IMU sensor 112 is configured to obtain sensor data SD. The controller 120 is configured to receive the sensor data SD from the ring device 110 and generate detection data. The detection data is configured to indicate whether the ring device 110 is rotated and whether the ring device 110 is tapped. The controller 120 is configured to perform a control operation in a virtual world displayed by the controller 120 based on the detection data. For example, the control operation may include at least one of a selection operation, a click operation, a forward operation, and a backward operation, but this disclosure does not limited thereto. In this manner, inputs from the user may be gathered without influence of the environment. Further, while the user is wearing the ring device 110, the user is still hand-free to do whatever the user wants to do. Therefore, the user experience is improved.

In one embodiment, the IMU sensor 112 includes, for example, a gyroscope, an accelerometer, other similar devices, or a combination of these devices. This disclosure is not limited thereto. In one embodiment, the IMU sensor 112 is a gyroscope and the sensor data SD includes three angular velocities in three degrees of freedom (DOF). The three angular velocities may include a roll angular velocity about an X axis, a pitch angular velocity about a Y axis, and a yam angular velocity about a Z axis. In one embodiment, the IMU sensor 112 is an accelerometer and the sensor data SD includes three linear acceleration values in three degrees of freedom. The three linear acceleration values may include a first acceleration value along the X axis, a second acceleration value along the Y axis, and a third acceleration value along the Z axis. In one embodiment, the IMU sensor 112 comprises a gyroscope and an accelerometer and the sensor data SD includes changes in six degrees of freedom and the changes in the six degrees of freedom includes the three angular velocities corresponding to three perpendicular axes (e.g., X, Y, Z axes) and the three linear acceleration values corresponding to the three perpendicular axes.

In one embodiment, the controller 120 may be a head-mounted display (HMD), wearable glasses (e.g., AR/VR goggles), a tablet, a smartphone, a projector, a laptop, other similar devices adapted for Extended Reality (XR) or other reality related technologies, or a combination of these devices. This disclosure is not limited thereto.

In one embodiment, the controller 120 may include a processor and the processor includes, for example, a micro-controller unit (MCU), a central processing unit (CPU), a microprocessor, a digital signal processor (DSP), a programmable controller, a programmable logic device (PLD), other similar devices, or a combination of these devices. The disclosure is not limited thereto. In addition, in an embodiment, each of functions of the processor may be achieved as multiple program codes. The program codes are stored in a memory, and executed by the processor. Alternatively, in an embodiment, each of the functions of the processor may be achieved as one or more circuits. The disclosure does not limit the use of software or hardware to achieve the functions of the processor.

In one embodiment, the controller includes a display module and the display module includes, for example, an organic light-emitting diode (OLED) display device, a mini LED display device, a micro LED display device, a quantum dot (QD) LED display device, a liquid-crystal display (LCD) display device, a tiled display device, a foldable display device, or an electronic paper display (EPD). However, the disclosure is not limited thereto.

In one embodiment, each of the ring device 110 and the controller 120 includes a network module and the network module includes, for example, a wired network module, a wireless network module, a Bluetooth module, an infrared module, a radio frequency identification (RFID) module, a Zigbee network module, or a near field communication (NFC) network module, but the disclosure is not limited thereto. That is, the ring device 110 is configured to communicate with the controller 120 through either wired communication or wireless communication.

It is noted that, the ring device 110 may include a processor and processor is configured to generate the detection data based on the sensor data SD. That is, the calculation may be processed in the ring device 110 instead of the controller 120. In addition, the controller 120 may receive the detection data from the ring device 120 to perform the selection operation or the click operation in the virtual world. Therefore, inputs from the user may be gathered without influence of the environment and the hand of the user is still free to move.

Figure 2A:
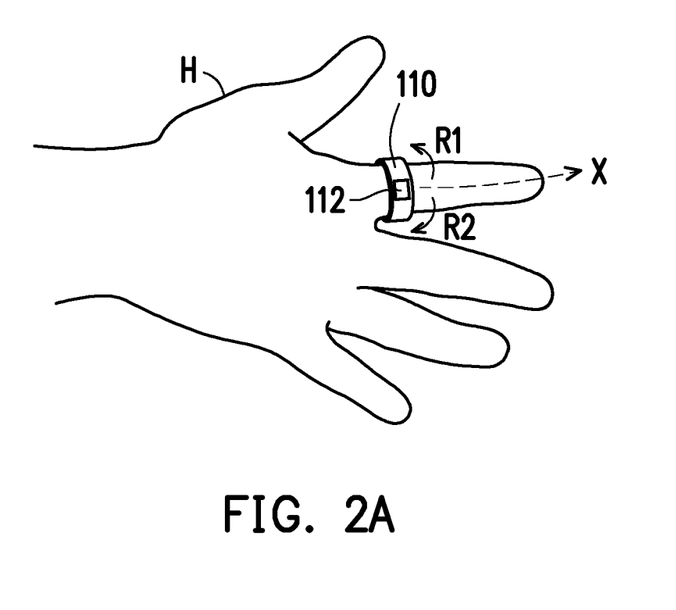
FIG. 2A is a schematic diagram of a control scenario in the real world according to an embodiment of the disclosure.
Figure 2B:
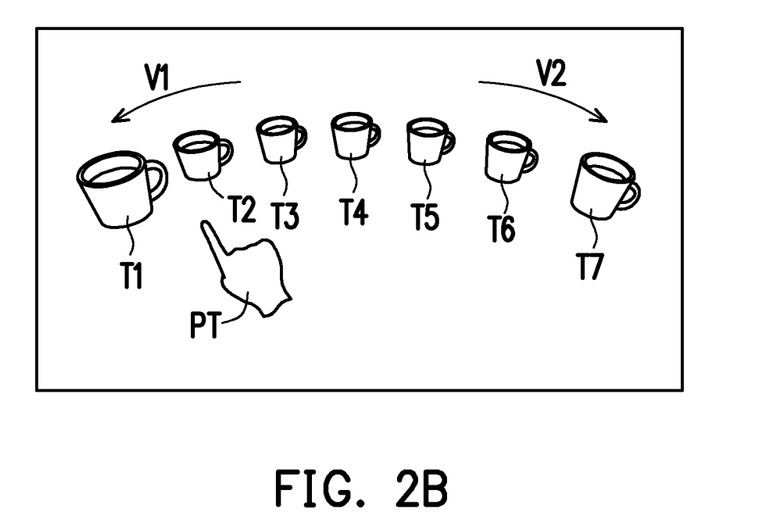
FIG. 2B is a schematic diagram of a control scenario in the virtual world according to an embodiment of the disclosure.

FIG. 2A is a schematic diagram of a control scenario in the real world according to an embodiment of the disclosure. FIG. 2B is a schematic diagram of a control scenario in the virtual world according to an embodiment of the disclosure. With reference to FIG. 1, FIG. 2A and FIG. 2B, FIG. 2A depicts that the ring device 110 gathers input from a finger of a hand H of a user in a real world and FIG. 2B depicts that a selection operation or a click operation is performed in a virtual world displayed by the controller 120.

Referring to FIG. 2A first, the ring device 110 is worn on a finger of a hand H of the user and the ring device 110 includes an IMU sensor 112. The user may rotate the ring device 110 (e.g., with the thumb) along a first real direction R1 or a second real direction R2 about an axis X of finger. The IMU sensor 112 may be configured to obtain sensor data SD and the sensor data SD may indicate the ring device 110 is rotated along the first real direction R1 or the second real direction R2.

Referring to FIG. 2B now, in a virtual world displayed by the controller 120, a plurality of targets T1~T7 are displayed in the virtual world and a pointer PT is configured to select at least one of the plurality of targets T1-T7. Further, a first virtual direction V1 corresponds to the first real direction R1 and a second virtual direction V2 corresponds to the second real direction V2. That is, when the user rotates the ring device 110 towards the first real direction R1, the pointer PT is configured to move towards the first virtual direction V1. Similarly, when the user rotates the ring device 110 towards the second real direction R2, the pointer PT is configured to move towards the second virtual direction V2.

In one embodiment, based on the detection data, the controller 120 is configured to perform a first operation or a second operation in the virtual world displayed by the controller 120. For example, in response to the ring device 110 is rotated indicating by the detection data, the controller 120 is configured to perform the first operation. Further, in response to the ring device 110 being tapped indicated by the detection data, the controller 120 is configured to perform the second operation. Furthermore, the controller 120 may be configured to perform the first operation to select among a plurality of targets T1~T7 and perform the second operation to determine one of the plurality of targets T1~T7 as a selected target. In this manner, the control system 100 is able to gather the input of the user without the influence of the environment and the hand H of the user is still free to move.

It is noted that, in the aforementioned embodiment, the controller 120 may be configured to perform the first operation to select among a plurality of targets T1~T7 and perform the second operation to determine one of the plurality of targets T1~T7 as a selected target. That is, the first operation may correspond to the selection operation and the second operation may correspond to the click operation. However, in another embodiment, the controller 120 is configured to perform the second operation to select among a plurality of targets T1~T7 and perform the first operation to determine one of the plurality of targets T1~T7 as a selected target. That is, the second operation may correspond to the selection operation and the first operation may correspond to the click operation. In other words, this disclosure does not limit the functions of the first operation (while the ring device 110 being rotated) and the second operation (while the ring device 110 being tapped) and the functions of the first operation and the second operation may be pre-determined by the controller 120 or determined according to a preference of the user.

Figure 3A:
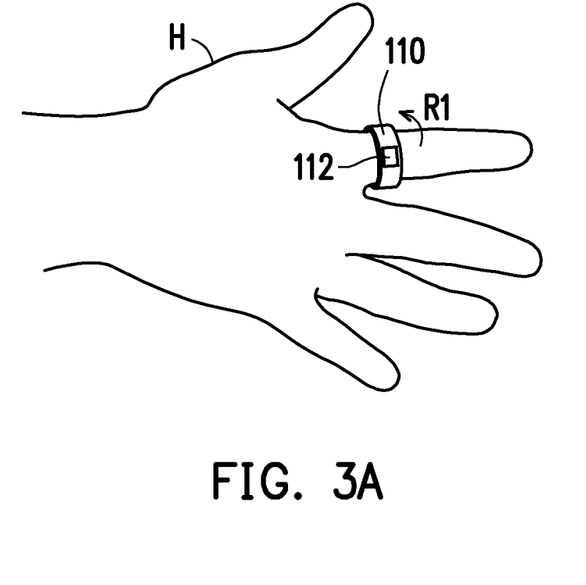
FIG. 3A is a schematic diagram of a control scenario in the real world according to an embodiment of the disclosure.
Figure 3B:
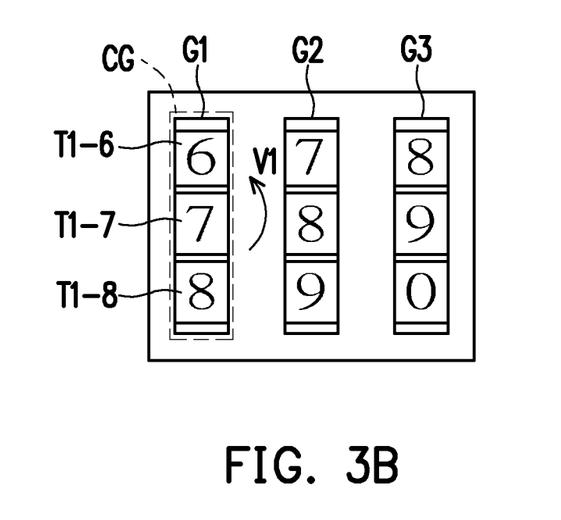
FIG. 3B is a schematic diagram of a control scenario in the virtual world according to an embodiment of the disclosure.
Figure 3C:
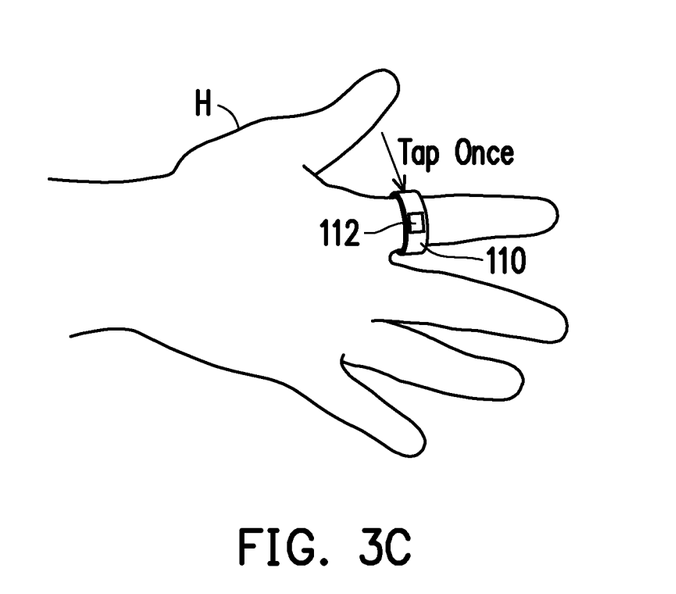
FIG. 3C is a schematic diagram of a control scenario in the real world according to an embodiment of the disclosure.
Figure 3D:
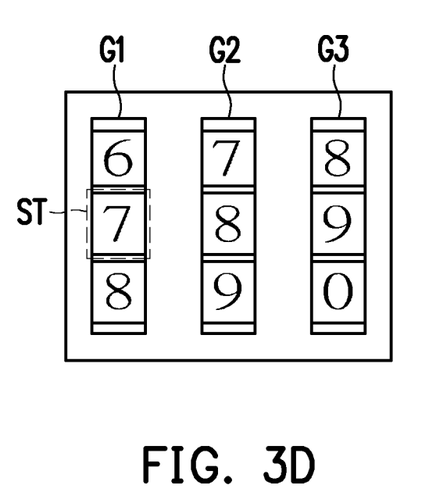
FIG. 3D is a schematic diagram of a control scenario in the virtual world according to an embodiment of the disclosure.
Figure 3E:
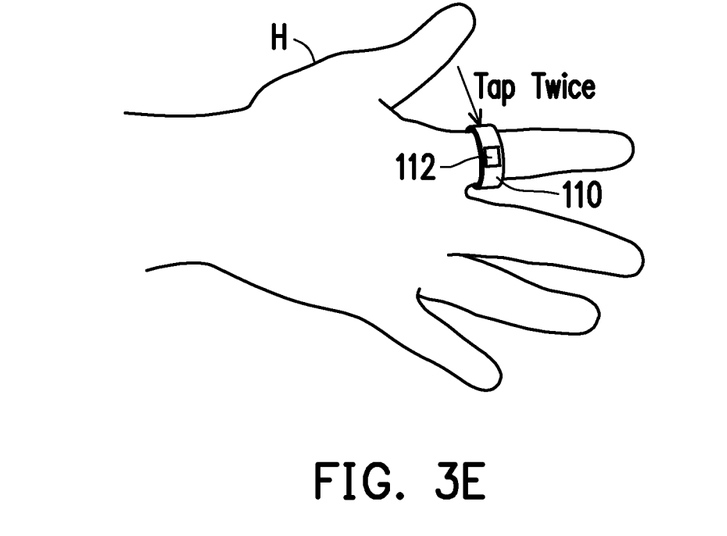
FIG. 3E is a schematic diagram of a control scenario in the real world according to an embodiment of the disclosure.
Figure 3F:
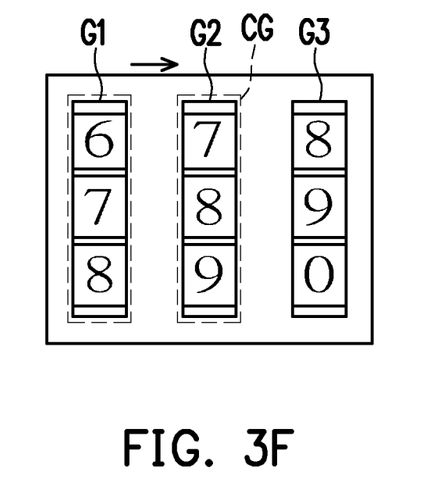
FIG. 3F is a schematic diagram of a control scenario in the virtual world according to an embodiment of the disclosure.

FIG. 3A is a schematic diagram of a control scenario in the real world according to an embodiment of the disclosure. FIG. 3B is a schematic diagram of a control scenario in the virtual world according to an embodiment of the disclosure. FIG. 3C is a schematic diagram of a control scenario in the real world according to an embodiment of the disclosure. FIG. 3D is a schematic diagram of a control scenario in the virtual world according to an embodiment of the disclosure. FIG. 3E is a schematic diagram of a control scenario in the real world according to an embodiment of the disclosure. FIG. 3F is a schematic diagram of a control scenario in the virtual world according to an embodiment of the disclosure. With reference to FIG. 1 and FIG. 3A to FIG. 3F, FIG. 3A, FIG. 3C, and FIG. 3E depict that the ring device 110 gathers input from a finger of a hand H of a user in a real world and FIG. 3B, FIG. 3D, and FIG. 3F depict that a selection operation or a click operation is performed in a virtual world displayed by the controller 120.

Referring to FIG. 3A first, the ring device 110 is worn on a finger of a hand H of the user and the ring device 110 includes an IMU sensor 112. The user may rotate the ring device 110 (e.g., with the thumb) along a first real direction R1. The IMU sensor 112 may be configured to obtain sensor data SD and the sensor data SD may indicate the ring device 110 is rotated along the first real direction R1.

Referring to FIG. 3B now, in a virtual world displayed by the controller 120, a first group G1 includes a plurality of first targets T1-0~T1-9 (first targets T1-0~T1-5, T1-9 are not shown), a second group G2 includes a plurality of second targets, a third group G3 includes a plurality of third targets. In addition, the first group G1 is determined as a current group CG for a selection of the user and the second group G2 is determined as a forward group. In other words, the controller 120 is configured to select among the plurality of first targets T1-0~T1-9 based on the detection data. Further, a first virtual direction V1 corresponds to the first real direction R1. That is, when the user rotates the ring device 110 towards the first real direction R1, the selection among the plurality of first targets T1-0~-T1-9 is towards the first virtual direction V1.

In one embodiment, based on the detection data, the controller 120 is configured to perform a first operation, a second operation, a third operation, and a fourth operation. The first operation, the second operation, the third operation, and the fourth operation may respectively correspond to a selection operation, a click operation, a forward operation, and a backward operation in the virtual world displayed by the controller 120, but this disclosure is not limited thereto.

For example, in response to the ring device 110 is rotated indicating by the detection data, the controller 120 may be configured to perform the first operation. Further, the controller 120 may be configured to perform the first operation to display at least a part (e.g., first targets T1-6~T1-8) of a plurality of first targets T1-0~T1-9 to select among the plurality of first targets T1-0~-T1-9.

Further, as shown in FIG. 3C, in response to the ring device 110 being tapped once indicated by the detection data, the controller 120 may be configured to perform the second operation. Further, the controller 120 may be configured to perform the second operation to determine one (e.g., first target T1-7) of the plurality of first targets T1-0~T1-9 as a first selected target ST as shown in FIG. 3D.

Furthermore, as shown in FIG. 3E, in response to the ring device 110 being tapped twice indicated by the detection data, the controller 120 may be configured to perform the third operation. Further, the controller 120 may be configured to perform the third operation to determine the second group G2 (i.e., the forward group at present) as a current group CG to select among a plurality of second targets of the second group G2 and determine the first group G1 as a backward group as shown in FIG. 3F.

Moreover, in response to the ring device 110 being tapped three times indicated by the detection data and the second group G2 being the current group, the controller 120 may be configured to perform the fourth operation. Further, in response to the second group G2 being the current group, the controller 120 may be configured to perform the fourth operation to determine the first group G1 as a current group CG and to select among the plurality of first targets T1-0~T1-9 of the first group G1.

In this manner, the control system 100 is able to gather the input of the user without the influence of the environment and the hand H of the user is still free to move.

It is noted that, in one embodiment, based on the detection data, the controller 120 may be configured to perform more than one operation at the same time in the virtual world displayed by the controller 120.

For example, in response to the ring device 110 is rotated indicating by the detection data, the controller 120 may be configured to perform a first operation and a second operation. In addition, the controller 120 may be configured to perform the first operation to display at least a part (e.g., first targets T1-6~T1-8) of a plurality of first targets T1-0~T1-9 to select among the plurality of first targets T1-0~T1-9 and perform the second operation to determine one (e.g., first target T1-7) of the plurality of first targets T1-0~T1-9 as a first selected target ST.

Further, in response to the ring device 110 being tapped once indicated by the detection data, the controller 120 may be configured to perform a third operation. In addition, the controller 120 may be configured to perform the third operation to determine the second group G2 as a current group CG to select among a plurality of second targets of the second group G2 and determine the first group G1 as a backward group.

Furthermore, in response to the ring device 110 being tapped twice indicated by the detection data and the second group G2 being the current group, the controller 120 may be configured to perform a fourth operation. In addition, the controller 120 may be configured to perform the fourth operation to determine the first group G1 as a current group CG to select among the plurality of first targets T1-0~T1-9 of the first group G1.

In this manner, the user is able to select and determine a target as a selected target at the same time and thereby improving the user experience.

Figure 4:
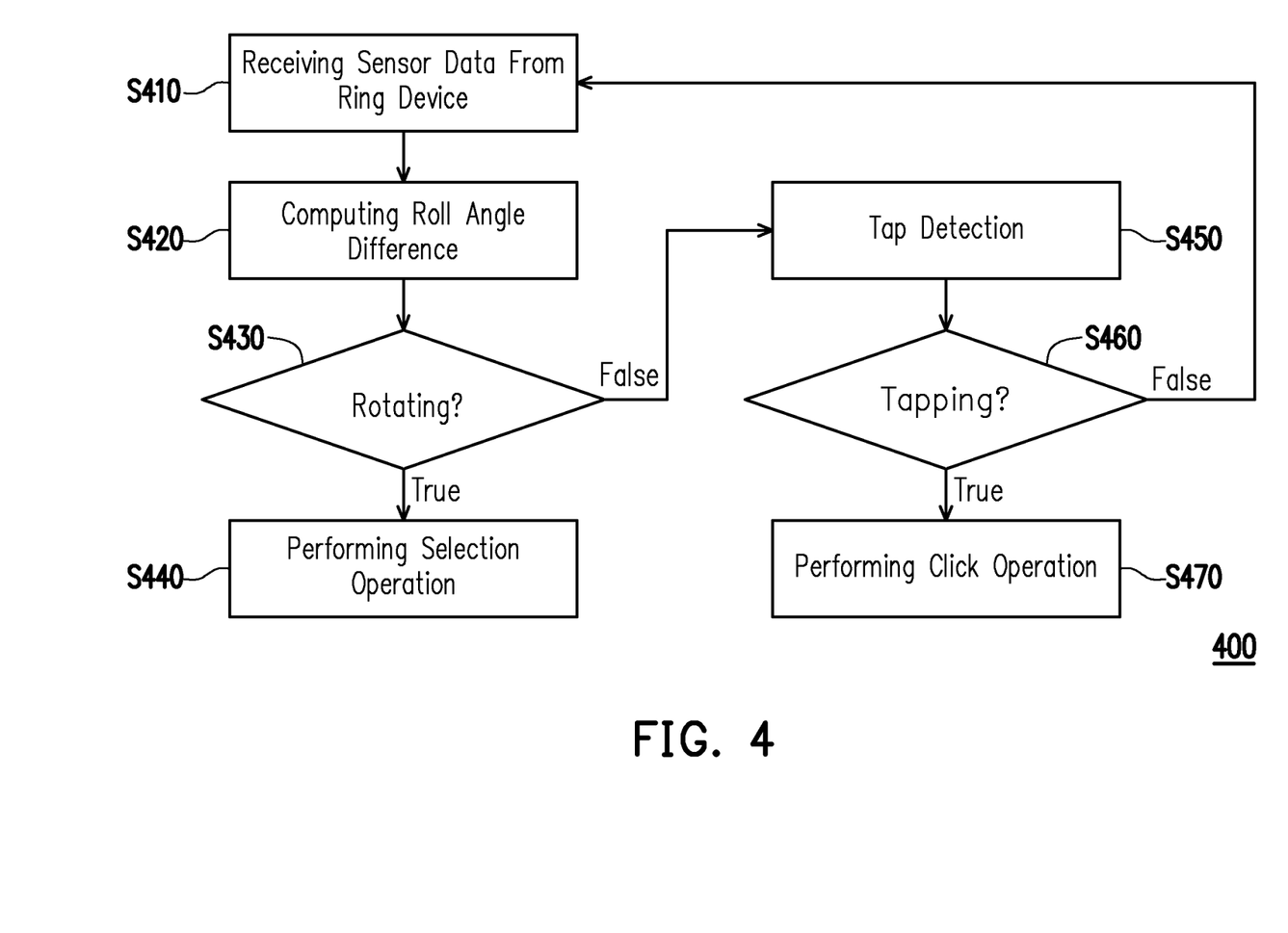
FIG. 4 is a schematic flowchart of a control method according to an embodiment of the disclosure.

FIG. 4 is a schematic flowchart of a control method according to an embodiment of the disclosure. With reference to FIG. 1 and FIG. 4, a control method 400 is adapted to the control system 100 and the control method 400 includes a step S410, a step S420, a step S430, a step S440, a step S450, a step S460, and a step S470.

In the step S410, the controller 120 is configured to receive the sensor data SD of the IMU sensor 112 from the ring device 110. In one embodiment, the IMU sensor 112 may include a gyroscope. That is, the sensor data SD may include a roll angular velocity about an axis (e.g., axis X shown in FIG. 2A) of the finger of the user.

In the step S420, the controller 120 is configured to compute a roll angle difference. In one embodiment, the controller 120 is configured to determine a roll angle difference based on the roll angular velocity. For example, the controller 120 is configured to compare a roll angle of a current moment with a roll angle of a previous moment to determine the roll angle difference.

In the step S430, the controller 120 is configured to determine the user is rotating the ring device 110 or not. In other words, the controller 120 is configured to determine the ring device 110 is rotated or not by the user. In one embodiment, in response to the roll angle difference being greater than a roll threshold angle, the controller 120 is configured to determine the ring device 110 is rotated. That is, the detection data is configured to indicated the ring device 110 is rotated. On the other hand, in response to the roll angle difference being not greater than the roll threshold angle, the controller 120 is configured to determine the ring device 110 is not rotated. That is, the detection data is configured to indicated the ring device 110 is not rotated.

In the step S440, when the ring device 110 being rotated is determined, the controller 120 is configured to perform the selection operation in the virtual world.

In the step S450, when the ring device 110 being not rotated is determined, the controller 120 is configured to perform a tap detection. For example, the sensor data SD may further include a pitch angular velocity and a yaw angular velocity. Further, the controller 120 is configured to perform a tap detection based on the roll angular velocity, the pitch angular velocity and the yaw angular velocity.

In the step S460, the controller 120 is configured to determine the user is tapping the ring device 110 or not. In other words, the controller 120 is configured to determine the ring device 110 is tapped or not by the user. In one embodiment, in response to the roll angle difference being not greater than the roll threshold angle, the pitch angular velocity being greater a pitch threshold angular velocity, and the yaw angular velocity being greater than a yaw threshold angular velocity, the controller 120 is configured to determine the ring device 110 is tapped. On the other hand, in response to the roll angle difference being not greater than the roll threshold angle, the pitch angular velocity not being greater the pitch threshold angular velocity, and the yaw angular velocity not being greater than the yaw threshold angular velocity, the controller 120 is configured to determine the ring device 110 is not tapped. When the ring device not being tapped is determined, the step S410 may be performed again.

In the step S470, when the ring device 110 being tapped is determined, the controller 120 is configured to perform the click operation in the virtual world.

It is worth mentioned that, comparing with the ring device 110 being rotated, the ring device 110 being tapped is more static. That is, the ring device 110 being rotated is more dynamic. Therefore, the controller 120 may be configured to determine the ring device 110 being rotated or not first. Further, only when the ring device 110 is not rotated, the controller 120 is configured to determine the ring device 110 being tapped or not. However, this disclosure does not limit the determining the ring device 110 being rotated or not first. That is, the sequence of the steps S410~S470 is an exemplary embodiment and this disclosure is not limited thereto.

In this manner, the control method 400 is able to determine the ring device 110 is being rotated or tapped by the user efficiently and accurately.

It is noted that, in one embodiment, the IU sensor 112 may include a gyroscope and an accelerometer. The sensor data SD may include a roll angular velocity about an axis of the finger and an acceleration value perpendicular to the axis of the finger. That is, the controller 120 may be configured to determine the ring device 110 is rotated or tapped not only based on the gyroscope but also the accelerometer. Therefore, the accuracy of the control method 400 may be further improved.

Figure 5A:
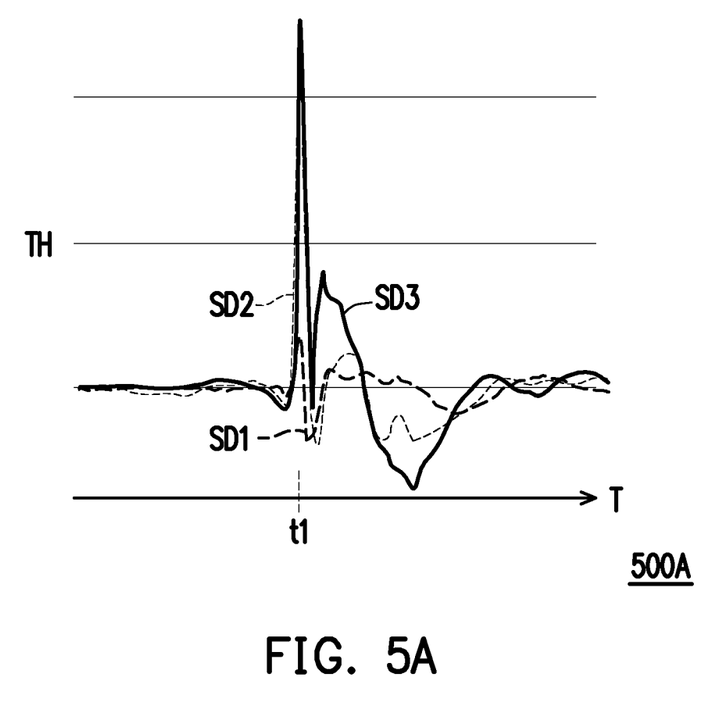
FIG. 5A is a schematic diagram of a tap detection mechanism according to an embodiment of the disclosure.
Figure 5B:
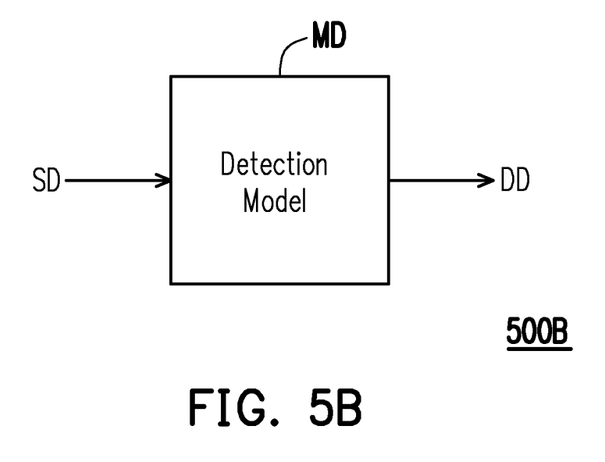
FIG. 5B is a schematic diagram of a tap detection mechanism according to an embodiment of the disclosure.

FIG. 5A is a schematic diagram of a tap detection mechanism according to an embodiment of the disclosure. FIG. 5B is a schematic diagram of a tap detection mechanism according to an embodiment of the disclosure.

With reference to FIG. 1 and FIG. 5A, a tap detection mechanism 500A depicts a tap detection based on the sensor data SD of the IMU sensor 112 of the ring device 110 over time. The horizontal axis indicates the time T and the vertical axis indicates a value of the sensor data SD. As shown in FIG. 5A, the values of a first sensor data SD1, a second sensor data SD2, and the third sensor data SD3 of the sensor data SD are shown. The controller 120 is configured to detect the user being tapping the ring device 110 while the first sensor data SD1 is smaller than a threshold value TH but both the second sensor data SD2 and the third sensor data SD3 are greater than the threshold value TH at the time t1.

It is worth mentioned that, comparing with the ring device 110 being rotated, the ring device 110 being tapped is more static. That is, the ring device 110 being rotated is more dynamic. Therefore, the controller 120 may be configured to determine the ring device 110 being rotated or not first.

Further, only when the ring device 110 is not rotated, the controller 120 is configured to determine the ring device 110 being tapped or not.

In one embodiment, the IMU sensor 112 includes a gyroscope and the first sensor data SD1 is a roll angular velocity, the second sensor data SD2 is a pitch angular velocity, and the third sensor data SD3 is a yaw angular velocity, but this disclosure is not limited thereto.

In this manner, the tap detection mechanism 500A is able to determine the ring device 110 is being rotated or tapped by the user efficiently and accurately.

With reference to FIG. 1 and FIG. 5B, a tap detection mechanism 500B depicts a tap detection based on a detection model. In one embodiment, the detection model MD is pre-trained by repetitively generating the detection data DD based on the sensor data SD. After enough rounds of training that the detection model MD is able to determine whether the ring device 110 is tapped or not. The detection model MD may be pre-stored in a memory of the controller 120. Hence, in response to the ring device 110 being not rotated being determined, the controller 120 is configured to determine whether the ring device 110 is tapped or not based on a tap detection mode MD. In addition, the detection model MD may be also trained to determine whether the ring device 110 is rotated or not.

In this manner, the tap detection mechanism 500B is able to determine the ring device 110 is being rotated or tapped by the user efficiently and accurately.

Figure 6:
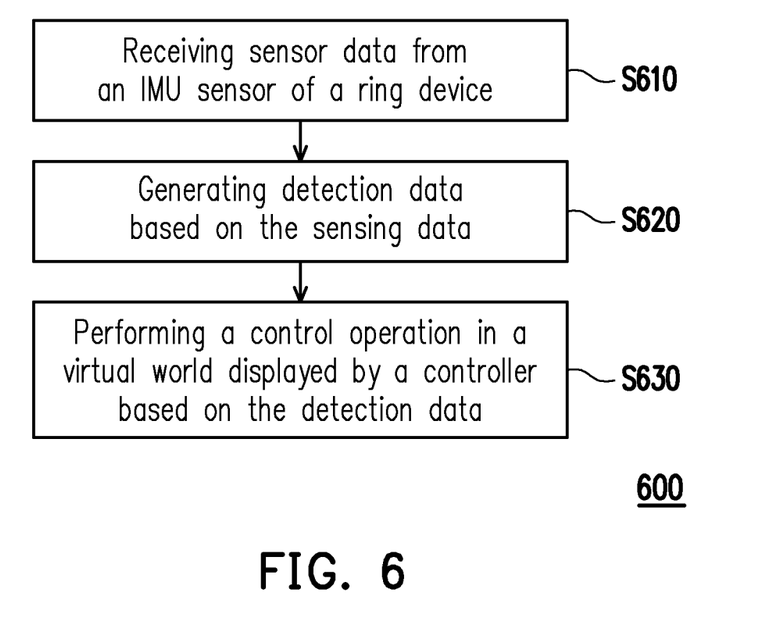
FIG. 6 is a schematic flowchart of a control method according to an embodiment of the disclosure.

FIG. 6 is a schematic flowchart of a control method according to an embodiment of the disclosure. With reference to FIG. 1 and FIG. 6, a control method 600 is adapted to the control system 100 and the control method 600 includes a step S610, a step S620, and a step S630.

In the step S610, the controller 120 is configured to receive the sensor data SD from the IMU sensor 112 of the ring device 110. In the step S620, the controller 120 is configured to generate detection data based on the sensor data SD. The detection data is configured to indicate whether the ring device is rotated and whether the ring device is tapped. In the step S630, the controller 120 is configured to perform a control operation in the virtual world displayed by the controller 120 based on the detection data. In this manner, the control method 600 is able to gather the input of the user without the influence of the environment and the hand of the user is still free to move.

In addition, the implementation details of the control method 600 may be referred to the descriptions of FIG. 1 to FIG. 5B to obtain sufficient teachings, suggestions, and implementation embodiments, while the details are not redundantly described seriatim herein.

In summary, according to the control system and the control method, inputs from the user may be gathered without influence of the environment and the hand of the user is still free to move.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A control system, comprising:
a ring device, comprising an inertial measurement unit (IMU) sensor, wherein the ring device is adapted to be worn on a finger of a user and the IMU sensor comprises a gyroscope and is configured to obtain sensor data, and
a controller, configured to:
receive the sensor data from the ring device and generate detection data based on the sensor data, wherein the detection data is configured to indicate whether the ring device is rotated and whether the ring device is tapped and the sensor data comprises a pitch angular velocity and a yaw angular velocity;
in response to the pitch angular velocity being greater a pitch threshold angular velocity, and the yaw angular velocity being greater than a yaw threshold angular velocity, determine the ring device is tapped; and
perform a control operation in a virtual world displayed by the controller based on the detection data.

2. The control system according to claim 1, wherein the control operation comprises a first operation and a second operation and the controller is further configured to:
in response to the ring device is rotated indicating by the detection data, perform the first operation; and
in response to the ring device being tapped indicated by the detection data, perform the second operation.

3. The control system according to claim 2, wherein the controller is further configured to:
perform the first operation to select among a plurality of targets; and
perform the second operation to determine one of the plurality of targets as a selected target.

4. The control system according to claim 2, wherein the controller is further configured to:
perform the second operation to select among a plurality of targets; and
perform the first operation to determine one of the plurality of targets as a selected target.

5. The control system according to claim 1, wherein the control operation comprises a first operation, a second operation, and a third operation and the controller is further configured to:
in response to the ring device is rotated indicating by the detection data, perform a first operation and a second operation; and
in response to the ring device being tapped indicated by the detection data, perform a third operation.

6. The control system according to claim 5, wherein the controller is further configured to:
perform the first operation to display at least a part of a plurality of first targets of a first group to select among the plurality of first targets;
perform the second operation to determine one of the plurality of first targets as a first selected target; and
perform the third operation to determine a second group as a current group to select among a plurality of second targets of the second group and determine the first group as a backward group.

7. The control system according to claim 1, wherein the sensor data comprises a roll angular velocity about an axis of the finger and the controller is further configured to:
determine a roll angle difference based on the roll angular velocity;
in response to the roll angle difference being greater than a roll threshold angle, determine the ring device is rotated; and
in response to the roll angle difference being not greater than the roll threshold angle, determine the ring device is not rotated.

8. The control system according to claim 1, wherein the controller is further configured to:
    determine whether the ring device is rotated or tapped based on a detection model, wherein the detection model is pre-trained by repetitively generating the detection data based on the sensor data.

9. The control system according to claim 1, wherein the IMU sensor comprises a gyroscope and an accelerometer and the sensor data comprises a roll angular velocity about an axis of the finger and an acceleration value perpendicular to the axis of the finger.

10. A control method, comprising:
    receiving sensor data from an inertial measurement unit (IMU) sensor of a ring device, wherein the ring device is adapted to be worn on a finger of a user and the IMU sensor comprises a gyroscope;
    generating detection data based on the sensor data, wherein detection data is configured to indicate whether the ring device is rotated and whether the ring device is tapped and the sensor data comprises a pitch angular velocity and a yaw angular velocity;
    in response to the pitch angular velocity being greater a pitch threshold angular velocity, and the yaw angular velocity being greater than a yaw threshold angular velocity, determining the ring device is tapped; and
    performing a control operation in a virtual world displayed by a controller based on the detection data.

11. The control method according to claim 10, wherein the control operation comprises a first operation and a second operation and the control method further comprises:
    in response to the ring device is rotated indicating by the detection data, performing the first operation; and
    in response to the ring device being tapped indicated by the detection data, performing the second operation.

12. The control method according to claim 11, further comprising:
    performing the first operation to select among a plurality of targets; and
    performing the second operation to determine one of the plurality of targets as a selected target.

13. The control method according to claim 11, further comprising:
    performing the second operation to select among a plurality of targets; and
    performing the first operation to determine one of the plurality of targets as a selected target.

14. The control method according to claim 10, wherein the sensor data comprises a roll angular velocity about an axis of the finger and the control further comprises:
    determining a roll angle difference based on the roll angular velocity;
    in response to the roll angle difference being greater than a roll threshold angle, determining the ring device is rotated; and
    in response to the roll angle difference being not greater than the roll threshold angle, determining the ring device is not rotated.

15. A control system, comprising:
    a ring device, comprising an inertial measurement unit (IMU) sensor, wherein the ring device is adapted to be worn on a finger of a user and the IMU sensor is configured to obtain sensor data; and
    a controller, configured to:
        receive the sensor data from the ring device and generate detection data based on the sensor data, wherein the detection data is configured to indicate whether the ring device is rotated and whether the ring device is tapped; and
        perform a control operation in a virtual world displayed by the controller based on the detection data, wherein the control operation comprises a first operation, a second operation, a third operation, and a fourth operation, wherein
        in response to the ring device being rotated as indicated by the detection data, perform the first operation;
        in response to the ring device being tapped once indicated by the detection data, perform the second operation;
        in response to the ring device being tapped twice indicated by the detection data, perform the third operation; and
        in response to the ring device being tapped three times indicated by the detection data, perform the fourth operation;
    wherein the controller is further configured to:
        perform the first operation to display at least a part of a plurality of first targets of a first group to select among the plurality of first targets;
        perform the second operation to determine one of the plurality of first targets as a first selected target;
        perform the third operation to determine a second group as a current group to select among a plurality of second targets of the second group and to determine the first group as a backward group; and
        in response to the second group being the current group, perform the fourth operation to determine the backward group as the current group to select among the plurality of first targets of the first group.

* * * * *